US008713667B2

(12) United States Patent
Kalibjian et al.

(10) Patent No.: US 8,713,667 B2
(45) Date of Patent: Apr. 29, 2014

(54) POLICY BASED CRYPTOGRAPHIC APPLICATION PROGRAMMING INTERFACE IN SECURE MEMORY

(75) Inventors: Jeff Kalibjian, Livermore, CA (US); Ralph Bestock, Los Altos, CA (US); Larry Hines, Santa Clara, CA (US); W. Dale Hopkins, Georgetown, KY (US); Vladimir Libershteyn, San Jose, CA (US); Steven W. Wierenga, Hillsborough, CA (US); Susan Langford, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3042 days.

(21) Appl. No.: 11/177,715

(22) Filed: Jul. 8, 2005

(65) Prior Publication Data

US 2007/0011736 A1    Jan. 11, 2007

(51) Int. Cl.
*G06F 9/00* (2006.01)
(52) U.S. Cl.
USPC .......................................................... 726/14
(58) Field of Classification Search
USPC ...................................... 726/14, 28; 713/182
See application file for complete search history.

(56) References Cited

U.S. PATENT DOCUMENTS

| 5,689,565 | A | 11/1997 | Spies |
| 6,279,054 | B1 | 8/2001 | Boyle |
| 6,370,249 | B1 | 4/2002 | Van Oorschot |
| 6,378,072 | B1 | 4/2002 | Collins |
| 6,484,259 | B1 | 11/2002 | Barlow |
| 6,715,077 | B1 | 3/2004 | Vasudevan |
| 6,839,437 | B1 | 1/2005 | Crane |
| 2001/0018746 | A1* | 8/2001 | Lin ................................. 713/201 |
| 2002/0073316 | A1 | 6/2002 | Collins |
| 2003/0005292 | A1 | 1/2003 | Matthews |
| 2003/0149883 | A1 | 8/2003 | Hopkins |
| 2004/0223607 | A1 | 11/2004 | Griffin |

OTHER PUBLICATIONS

Federal Information Processing Standards Publication FIPS PUB 140-2: Security Requirements for Cryptographic Modules. Issued May 25, 2001. (69 pages).*
Aspencrypt.com: Learn About Windows Cryptography. © 1999 Persits Software Inc. http://web.archive.org/web/20000617232309/http://www.aspencrypt.com/task_learn.html.*
Aspencrypt.com: Encrypt and Decrypt Files and Messages. © 1999 Persits Software Inc. http://web.archive.org/web/20000617133611/www.aspencrypt.com/task_encrypt.html.*
Apple Developer Connection: "About Memory" Published Jul. 3, 1996 (12 pages) http://developer.apple.com/documentation/Mac/Memory/Memory-10.html.*

(Continued)

*Primary Examiner* — Beemnet Dada
*Assistant Examiner* — Thomas Gyorfi

(57) ABSTRACT

Systems, methods, and apparatus are provided for policy protected cryptographic Application Programming Interfaces (APIs) that are deployed in secure memory. One embodiment is a method of software execution. The method includes executing an application in a first secure memory partition; formatting a request to comply with a pre-defined secure communication protocol; transmitting the request from the application to a cryptographic application programming interface (API) of the application, the API being in a second secure memory partition that is separate and secure from the first secure memory partition; and verifying, in the second secure memory partition, that the request complies with a security policy before executing the request.

19 Claims, 4 Drawing Sheets

(56) References Cited

OTHER PUBLICATIONS

Bacon, Jean et al. "Operating Systems: Concurrent and Distributed Software Design" © 2003 Addison Wesley Inc. Excerpt from Chapter 27 (7 pages).*

Wikipedia article for "Memory Protection" originally Published May 30, 2005 (4 pages) http://en.wikipedia.org/w/index.php?title=Memory_protection&oldid=16355442.*

Security Service API: Cryptographic API Recommendation Updated and Abridged Edition, NSA Cross Organization CAPI Team, The National Security Agency, Jul. 25, 1997.

Security Service API: Cryptographic API Recommendation, NSA Cross Organization CAPI Team, Jun. 12, 1995.

Proceedings of the Linux Symposium, Jul. 23-26, 2003, Ottawa, Ontario, Canada.

\* cited by examiner

POLICY BASED CRYPTOGRAPHIC APPLICATION PROGRAMMING INTERFACE IN SECURE MEMORY

BACKGROUND

Application programming interfaces (APIs) generally execute in the same processing space as the corresponding application. The application has unprotected access to the API and its functions. The API, for example, provides calling conventions for the application program to access the operating system and other services. The architecture between the application and API, however, has given rise to security concerns.

The development of cryptographic APIs allows programmers and software developers to use strong cryptography without having to understand the implementation of cryptographic algorithms. As a result, security has increased for many applications. Security issues, however, still exist for some applications utilizing cryptographic APIs.

Development paradigms that use cryptographic APIs depend on an application developer to have sufficient security knowledge with respect to selecting cryptographic algorithms, key sizes, key types, and other cryptographic parameters. If the application developer does not have sufficient knowledge about such cryptographic parameters, then security issues can arise. For example, companies may be unable to verify or insure whether an application (when using cryptographic APIs) is performing operations that are using policy controlled APIs is violating company security policies. Further, most security conscious organizations desire to have control over such parameters.

Security issues in cryptographic APIs can arise in other instances. As another example, the cryptographic APIs (such as the cryptographic API implementation libraries) run in the same process space as the application. Thus, the API and application are vulnerable to attack, compromise, misuse, or other security breaches since the application has unprotected access to the API. A hostile process, for instance, could subvert the cryptographic API and obtain services the application is not entitled to receive.

DETAILED DESCRIPTION

Exemplary embodiments in accordance with the present invention are directed to systems, methods, and apparatus for policy protected cryptographic Application Programming Interfaces (APIs) that are deployed in secure memory partitions. These embodiments are be utilized with various systems and apparatus.

Figure 1:
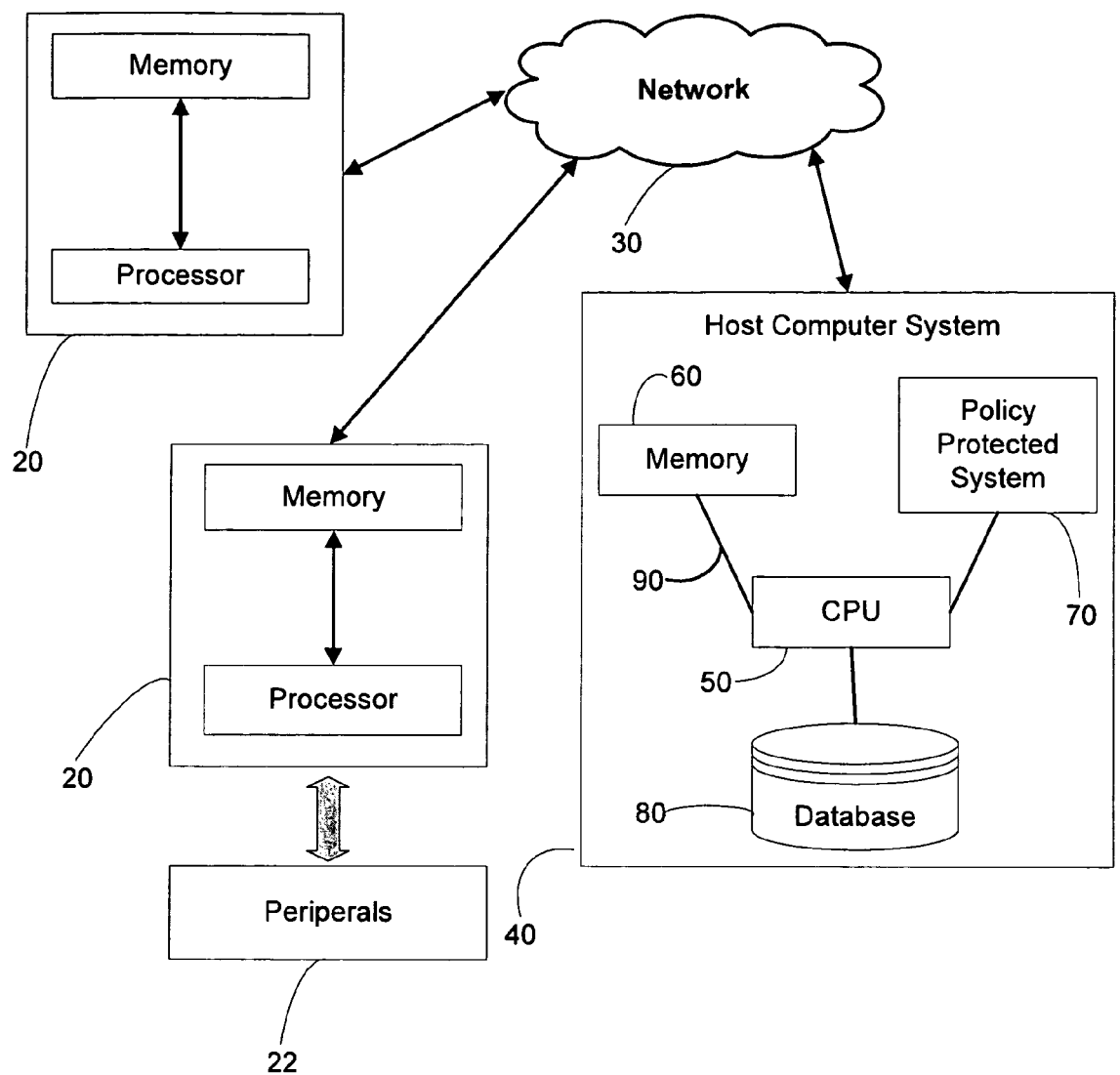
FIG. 1 illustrates an exemplary system and data processing network in accordance with an embodiment of the present invention.

FIG. 1 illustrates an exemplary system in which an embodiment in accordance with the present invention is practiced. The system includes a plurality of computing devices 20 in communication with a network 30 that is in communication with a host computer system 40.

For convenience of illustration, only a few computing devices 20 are illustrated. The computing devices include a processor, memory, and bus interconnecting various components. Embodiments in accordance with the present invention are not limited to any particular type of computing device since various portable and non-portable computers and/or electronic devices can be utilized. Exemplary computing devices include, but are not limited to, computers (portable and non-portable), servers, laptops, notebooks, personal digital assistants (PDAs), tablet PCs, handheld and palm top electronic devices, compact disc players, portable digital video disk players, radios, cellular communication devices (such as cellular telephones), televisions, and other electronic devices and systems whether such devices and systems are portable or non-portable.

In one exemplary embodiment, at least one computing device is coupled or connected to a peripheral device 22. A peripheral or peripheral device is a computing device that couples to a computer in order to expand capabilities of the computer. Peripheral devices include, but are not limited to, drives (such as optical, tape, floppy, disk, zip, etc.), printers, scanners, mouse, keyboard, monitors, and other electronic devices that connect (directly or indirectly) to a computer.

The network 30 is not limited to any particular type of network or networks. The network 30, for example, includes a local area network (LAN), a wide area network (WAN), the internet, an extranet, an intranet, digital telephony network, digital television network, digital cable network, various wireless and/or satellite networks, to name a few examples.

The Host computer system 40 comprises a processing unit 50 (such as one or more processors of central processing units, CPU) for controlling the overall operation of memory 60 (such as random access memory (RAM) for temporary data storage and read only memory (ROM) for permanent data storage) for storing an operating system (OS), a policy checking system 70, and a non-volatile data base or data warehouse 80 for storing control programs and other data associated with host computer system 40. The processing unit 50 communicates with memory 60, data base 80, policy checking system 70, and many other components via buses 90.

In some embodiments, the host computer system 40 is located a great geographic distance from the network 30 and/or computing devices 20. Further, the host computer system 40 includes, for example, computers (including personal computers), computer systems, mainframe computers, servers, distributed computing devices, and gateway computers, to name a few examples.

Those skilled in the art will appreciate that the computing devices 20 and host computer system 40 connect to each other and/or the network 30 with various configurations. Examples of these configurations include, but are not limited to, wireline connections or wireless connections utilizing various media such as modems, cable connections, telephone lines, digital subscriber lines (DSL), satellite, LAN cards, and cellular modems, just to name a few examples. Further, the connections can employ various protocol known to those skilled in the art, such as the Transmission Control Protocol/Internet Protocol ("TCP/IP") over a number of alternative connection media, such as cellular phone, radio frequency networks, satellite networks, etc. or UDP (User Datagram Protocol) over IP, Frame Relay, ISDN (Integrated Services Digital Network), PSTN (Public Switched Telephone Network), just to name a few examples. Many other types of digital communication networks are also applicable. Such networks include, but are not limited to, a digital telephony network, a digital television network, or a digital cable network, to name a few examples. Further yet, although FIG. 1 shows one exemplary system and network, embodiments in accordance with the present invention can utilize various computer/network architectures. Various alternatives for connecting servers, computers, and networks will not be described as such alternatives are known in the art.

Figure 2:
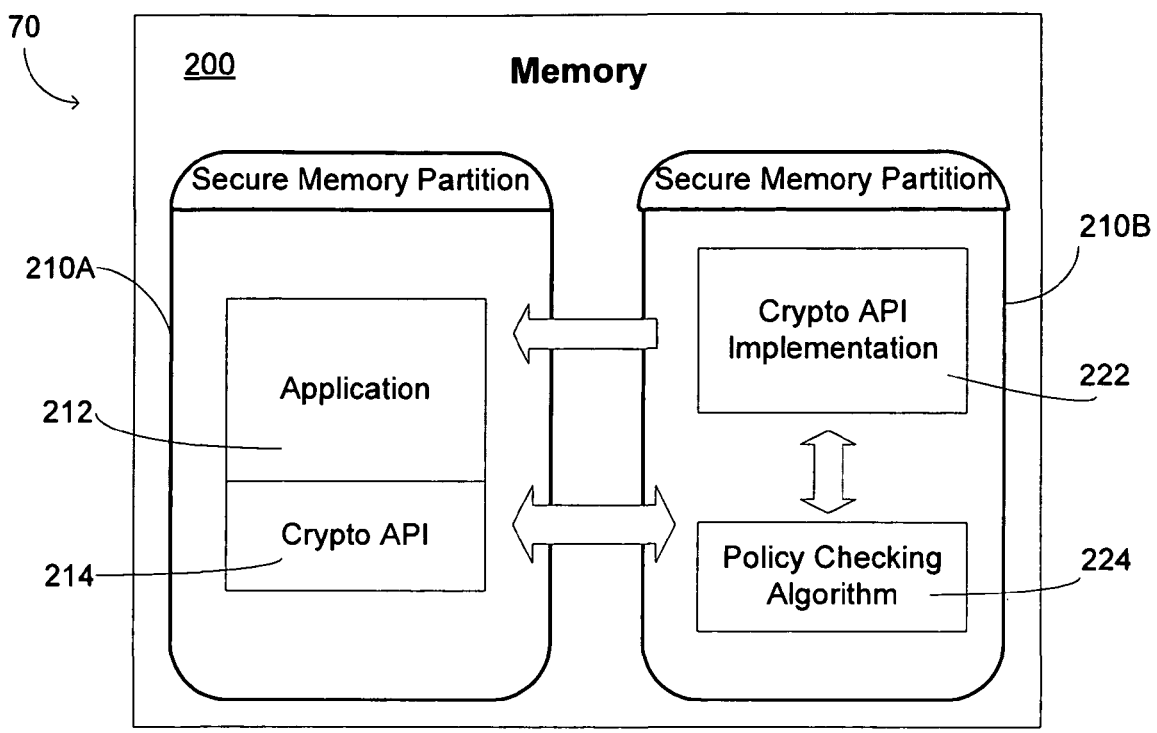
FIG. 2 illustrates an exemplary memory structure in accordance with an embodiment of the present invention.
Figure 3:
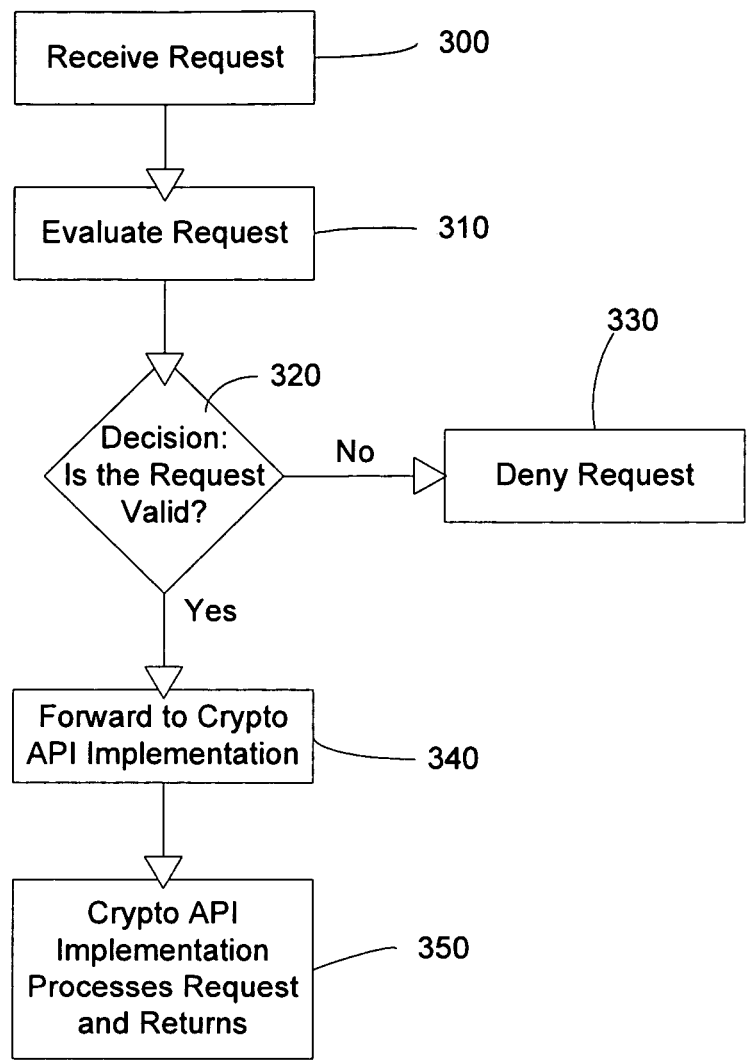
FIG. 3 illustrates an exemplary flow diagram of a policy checking algorithm in accordance with an embodiment of the present invention.
Figure 4:
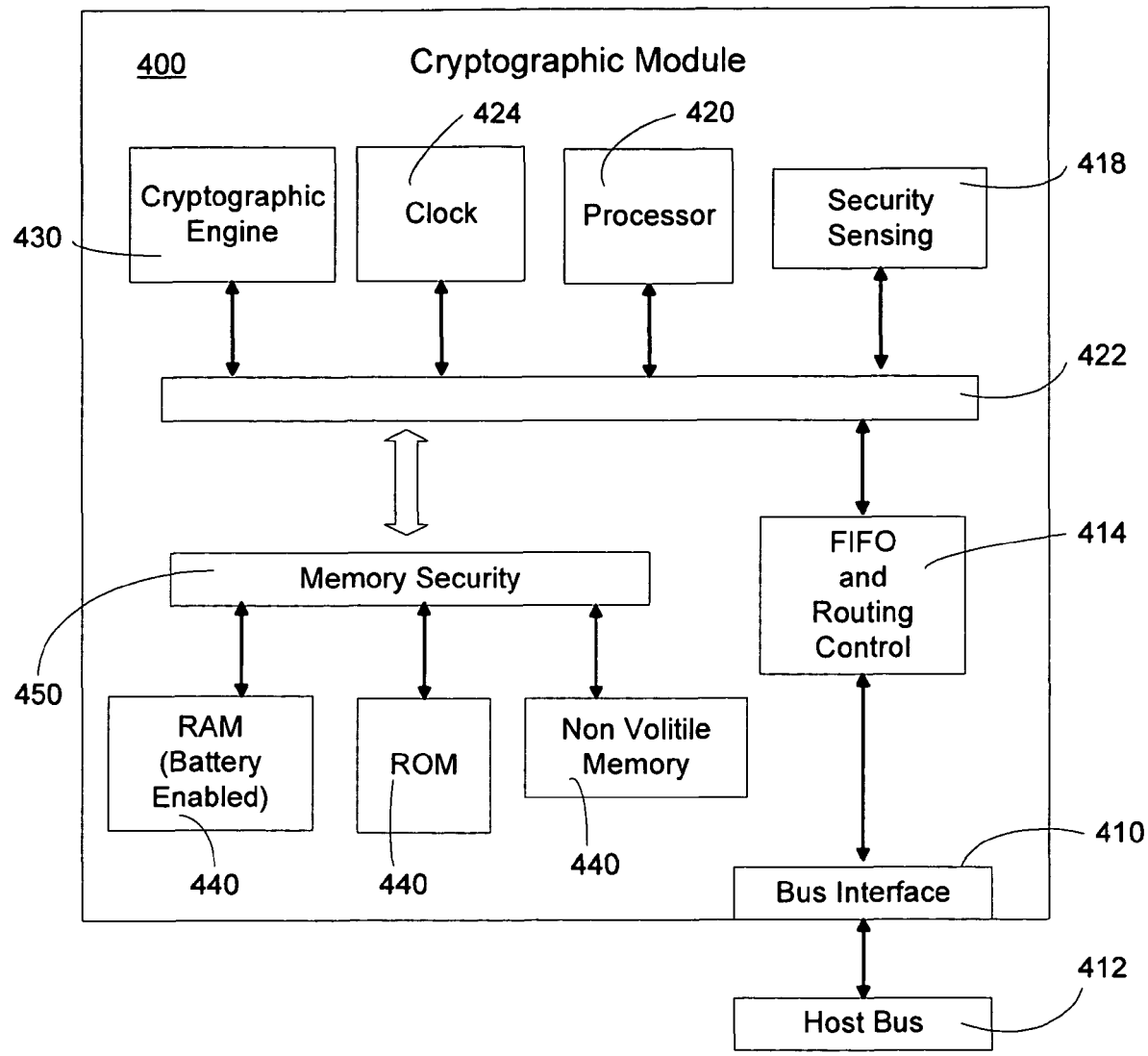
FIG. 4 illustrates an exemplary cryptographic module in accordance with an embodiment of the present invention.

Reference is now made to FIGS. 2-4 wherein exemplary embodiments in accordance with the present invention are discussed in more detail. In order to facilitate a more detailed discussion of exemplary embodiments, certain terms and nomenclature are explained.

As used herein, application programming interface (API) is a set of routines (section of program that performs a particular task, synonymous with procedure, function, and subroutine), protocol (format for transmitting data between electronic devices), and/or tool for constructing software applications. An API, for example, includes building blocks for enabling a programmer to build a software application that is consistent with a particular application or operating environment. Further, as used herein, an application or software application is computer software that uses a computer or processor to perform a task (example, one or more programs for end users). Applications are used in various embodiments such as, but not limited to, desktop environments, document preparation systems (example, word processors), spreadsheets, media players, application suites (example, bundled programs), and other user software. Further yet, as used herein, a call or request invokes a routine, program, or variable of a program into effect. Calls and requests can specify, for example, the routine name and parameters.

FIG. 2 illustrates an exemplary embodiment for the policy checking system 70. In this example, memory 200 is divided into two separate and distinct secure sections or partitions 210A and 210B (in other examples, memory partitions are divided into more than two secure sections). Each memory partition is reserved for a particular application or program. In one exemplary embodiment, the first secure memory partition 210A includes an application or applications 212 and cryptographic API 214. The second secure memory partition 210B includes cryptographic API implementation 222 and policy checking application or algorithm 224.

In one exemplary embodiment of the policy checking system 70, the cryptographic API implementation 222 runs or executes in a separate and secure processing space or memory partition from the application 212 that utilizes the services or resources of the cryptographic API implementation 222. A secure operating system includes secure memory partitions or processing space that insures applications running in one partition 210A cannot gain access and corrupt applications running in another partition 210B. Secure message passing between the two secure memory partitions enables the application 212 and cryptographic API implementation 222 to communicate. Specifically, cryptographic API parameters are communicated to a separate process that actually implements the API.

In one exemplary embodiment, the application 212 makes API requests or calls via a secure messaging paradigm. The policy checking algorithm 224 defines a security policy or rules for use and limitations of the functionality of the APIs (example, allowable cryptographic algorithms to use, key sizes, allowable hash algorithms, etc.). The security policy describing the use and limitations of the APIs is securely established and cryptographically bound to the implementation of the cryptographic APIs. When the application 212 makes API requests, the policy checking algorithm 224 evaluates the request with respect to the established security policy. If the request is valid (i.e., the request does not violate one or more rules of the security policy), then the request is carried-out, executed, or permitted. If, on the other hand, the request is not valid (i.e., the request violates one or more security policies), then the request is denied or refused. In one exemplary embodiment, cryptographic keys created by a prior call to one of the APIs are strongly typed to aid in policy and data protection.

FIG. 3 illustrates an exemplary flow diagram for the policy checking algorithm 224 of FIG. 2. Reference is simultaneously made to FIGS. 2 and 3.

According to block 300, the policy checking algorithm 224 receives a request. The policy checking algorithm 224 evaluates the request according to predefined security policies, and a decision is then made according to block 320. If the request is not valid, then the request is denied according to block 330. If the request is valid, then according to block 340 the request is sent or forwarded to the cryptographic API implementation 222. The cryptographic API implementation 222 then processes the request and returns.

Initially, the application 212 makes a request of the cryptographic API implementation 222. The request is made from the first secure processing space or memory partition 210A and is transmitted to the second secure processing space or memory partition 210A. Before the request is transmitted, the cryptographic API 214 formats, encodes, or encrypts the request to comply with a pre-established communication protocol for interacting with the policy checking algorithm 224 in the other secure memory partition.

A wide variety of different security policies are within embodiments in accordance with the invention. Such policies vary according to the desired level of security. Examples are provided to illustrate the breadth of such security policies, but the examples should not be construed as limiting embodiments in accordance with the invention.

In one exemplary embodiment, messages transmitted between the first and second secure memory partitions 210A, 210B create cryptographic keys of a particular size and type. Cryptographic keys include symmetric and/or asymmetric keys. Symmetric keys are generally kept within a restricted group of users or applications, because if a message is encrypted with a symmetric key K1 then anyone knowing K1 can decrypt that message. By contrast, in asymmetric keys, at least one pair of keys is associated with each owner. One key of each pair of keys is private (known and kept only by its owner). The other key is public (i.e., the key is freely distributed to the public). A message encrypted with one of the keys of the pair can be decrypted only with the other key in the pair. In addition, a message can be cryptographically signed with one of the keys in the pair and the second key in the pair can then be used to verify the authenticity of the specific message.

Various cryptographic key exchanges are within embodiments in accordance with the present invention. Such key exchanges, for example, include RSA (Rivest, Shamir, and Adleman) algorithms, the Certicom ECC (elliptic curve cryptography) algorithm, Diffie-Hellman algorithms, and any other cryptographic key exchange algorithm. Embodiments of the invention, though, should not be limited to any particular key exchange protocol.

According one exemplary embodiment, the policy checking algorithm 224 establishes the use of hashes or hashing algorithms. A hash value, for example, is a number generated from a string of text or data. The hash is generally smaller than the text itself and is generated by a formula. A hash function H, for example, is a transformation that takes an input "m" and returns a fixed-size string, called a hash value "h" (such that h=H(m)). This value is also called the message digest. In one exemplary embodiment, cryptographic hashes are used. In a cryptographic hash, the hash value is computationally simple to calculate for an input, but it is difficult to find two inputs that have the same value or to find an input that has a particular hash value. Further, the hash function can be collision-resistant. The bit-length of the hash code is sufficiently long to avoid having accidental hash collisions among truly different requests.

The security policy can also specify particular attributes of the messages or requests. For example, the security policy can specify that valid requests utilize a particular cryptographic key size or a particular cryptographic algorithm or hashing algorithm (such as SHA-1 or MD-5).

Before transmitting the request to the cryptographic API implementation 222, the cryptographic API 214 formats, encodes, or encrypts the request according to the pre-established security policy. The request is then transmitted to the policy checking algorithm 224, and the request is evaluated to see if it complies with the security policy. If the request is validated, then API parameters are sent to appropriate hardware, and the request is executed.

Embodiments in accordance with the present invention can be implemented in a secure environment, such as a secure cryptographic module. As used herein, a cryptographic module is a set of software, hardware, and/or firmware that utilizes a security policy (example, cryptographic algorithms and/or key generation) and that is contained within physical bounds of a module.

FIG. 4 shows one exemplary cryptographic module 400 that is adapted to withstand both logical and physical intrusions. In some exemplary embodiments, the module 400 is adapted to meet various levels (example, levels 1 to 4) of the Federal Information Processing Standard (FIBS) PUB 140-2. For instance, the module 400 meets the level 4 physical security standard that mandates a complete envelope of protection around a cryptographic module for detecting and responding to unauthorized attempts at physical access. Level 4 also protects the module against security compromise due to environmental conditions outside of the module. The module includes detection mechanisms that sense any unauthorized attempt at physical access to the cryptographic module. If an unauthorized physical access is detected, memory within the module is erased.

A bus interface 410 couples to both the host bus 412 and FIFO (first-in, first-out buffers) and routing control module 414. The module 414 couples secured components to the bus interface and provides inbound and outbound direct memory access (DMA) operations. A driver directs data flow in conjunction with the host system device driver.

The security sensing device 418 includes sensors and/or circuitry for detecting intrusions, such as tamper detection, penetration, or erosion attacks. In one example, the module 400 is housed in an enclosure that employs a circuit to detect attempts to open the enclosure. Additional sensors, for example, can detect temperature fluctuations, power sequencing, radiation, etc. In the event of a breach of security, the memory can be erased and the processor shutdown.

The processor 420 provides processing function for the module and provides control of secure cryptographic algorithms and processes. The processor is coupled to the various electronic components via a bus 422. The clock 424, for example, provides a source for time and date of events.

A cryptographic engine 430 enables a wide variety of cryptographic technologies. By way of example, the cryptographic engine can enable encryption processing (such as data encryption standard, DES, processing), SHA-1 hashing, random number generation, RSA and Diffie-Heilman type algorithms, etc.

Various types of memory 440 (such as RAM, ROM, and various forms of non volatile memory) are provided. By way of example, such memory includes persistent storage (such as flash memory) to maintain data. In some embodiments, at least some portions of the memory are battery enabled. In absence of power to the module, batteries provide power to volatile memory. Further, batteries can provide power to the security sensing device 418 (such as to tamper sensing electronics)

Further, memory security 450 (such as hardware locks) can be provided to render areas or memory inaccessible. The memory security, for example, ensures that only authorized firmware or applications can alter specified executable code, such as code of the operating system.

In one exemplary embodiment, the operating system is secured within the cryptographic module 400. As used herein, an operating system (OS) includes system applications and/or software that direct control and management of hardware and basic system operations. The OS, for instance, provides a foundation for executing applications, such as applications and APIs discussed in connection with FIGS. 2 and 3.

In one exemplary embodiment, the OS is secured within a bottom layer of memory. The applications (such as application 212) are positioned on top of the OS with the API layer positioned between the OS and application layer. Applications access services of the OS through the OS's API. Thus, applications communicate with each other through APIs.

In one exemplary embodiment in accordance with the present invention, the memory 200 (shown in FIG. 2) is provided within a cryptographic module or secure hardware environment. The policy checking algorithm 224 can therefore be executed within a secured boundary of memory that itself is within both physically and logically secured environment.

Embodiments in accordance with the present invention can be utilized in a wide variety of different applications. The following examples provide an illustration of this diversified applicability and use. Embodiments, for example, can be used in environments that require high security, such as data confidentiality or application certainty (i.e., verification that applications are not altered or accessed). Further examples include, but are not limited to, public key infrastructure (PKI) applications, smart cards, finance industry applications, dedicated security appliances (such as auditing servers that digitally sign documents), data archival applications (such as applications providing proof of non-tampering), trusted printing applications, and other applications requesting secure computing or storage environments.

In one exemplary embodiment, the flow diagrams are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

Embodiments in accordance with the present invention have a wide variety of applicability and configurations. For example, the first and second secure memory partitions 210A, 210B can be located in separate cryptographic modules. Further, messaging or communication between the first and second secure memory partitions 210A, 210B can occur over a network, such network 30 of FIG. 1. Further yet, the first and second secure memory partitions can be proximate each other (such as located in the same cryptographic module) or geographically located a great distance from each other (such as being in separate cryptographic modules).

The flow diagrams in accordance with exemplary embodiments of the present invention are provided as examples and should not be construed to limit other embodiments within the scope of the invention. For instance, the blocks should not be construed as steps that must proceed in a particular order. Additional blocks/steps can be added, some blocks/steps removed, or the order of the blocks/steps altered and still be within the scope of the invention In the various embodiments in accordance with the present invention, embodiments are implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software (whether on the host computer system of FIG. 1, a client computer, or elsewhere) will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory, and accessed by the processor using the bus. The techniques and methods for embodying software programming code in memory, on physical media, and/or distributing software code via networks are well known and will not be further discussed herein. Further, various calculations or determinations (such as those discussed in connection with the figures are displayed, for example, on a display) for viewing by a user.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for software execution by a computer, comprising:
   executing an application in a first secure memory partition;
   formatting a request to comply with a pre-defined secure communication protocol;
   transmitting the request from the application to a cryptographic application programming interface (API) of the application, the API being in a second secure memory partition that is separate and secure from the first secure memory partition;
   verifying, in the second secure memory partition, that the request complies with a security policy before executing the request; and
   encrypting the request with a cryptographic algorithm before transmitting the request from the application to the API.

2. The method of claim 1 further comprising: executing the method of software execution in a secure cryptographic module that detects physical intrusions.

3. The method of claim 1 further comprising: defining, by the security policy, a specific type of cryptographic algorithm that the application is to use for a valid request.

4. The method of claim 1 further comprising: defining, by the security policy, a specific cryptographic key size that the application is to use for a valid request.

5. The method of claim 1 further comprising: defining, by the security policy, a specific type of hashing algorithm that the application is to use for a valid request.

6. The method of claim 1 further comprising: using the security policy to prevent access of application to the API unless the application complies with the security policy.

7. A method for software execution by a computer, comprising:
   executing an application in a first secure memory location of a secure cryptographic module;
   transmitting a call from the application to an application programming interface (API) of the application, the API being in a second secure memory location of the secure cryptographic module, the second secure memory location being separate and secure from the first secure memory location;
   evaluating the call in the second secure memory location to determine whether the call complies with a security policy before executing the call; and
   encrypting the call with a cryptographic algorithm before transmitting the call from the application to the API.

8. The method of claim 7 further comprising: hashing the call with a hashing algorithm before transmitting the call from the application to the API.

9. The method of claim 7 further comprising: enveloping the secure cryptographic module within a secure housing having circuitry for detecting intrusions into the housing.

10. The method of claim 7 further comprising:
    forwarding the call to an API implementation if the call complies with the security policy;
    denying the call if the call does not comply with the security policy.

11. The method of claim 7 further comprising: executing the call if the call complies with the security policy and is encrypted with a predetermined cryptographic algorithm that is specified in the security policy.

12. The method of claim 7 further comprising: executing the call if the call complies with the security policy and is encrypted to have a predetermined key size that is specified in the security policy.

13. A computer system, comprising:
    means for storing an application in a first secure memory location;
    means for formatting a request to comply with a security policy;
    means for transmitting the request from the application to a cryptographic application programming interface (API) of the application, the API being stored in a second secure memory location that is secure and separate from the first secure memory location;
    means for verifying, in the second secure memory location, that the request complies with the security policy before executing the request;
    means for enclosing the first and second memory locations in a secure module that detects physical intrusions; and
    means for encrypting the request with a cryptographic algorithm before transmitting the request from the application to the API.

14. The computer system of claim 13, wherein the means for enclosing includes sensors for sensing unauthorized physical access.

15. The computer system of claim 14, wherein the means for enclosing complies with level 4 of the Federal Information Processing Standard Publication 140-2.

16. A computer system, comprising:
   memory having first and second secure portions, the first secure portion storing an application and the second secure portion storing a policy checking algorithm and an application programming interface (API) of the application;
   a processor coupled to the memory for executing the application, the API, and the policy checking algorithm to:
      transmit a call from the application to the API,
      encrypt the call with a cryptographic algorithm before transmitting the call from the application to the API;
      evaluate the call to determine whether the call complies with a security policy of the policy checking algorithm,
      execute the call if the call complies with the security policy, and
      deny the call if the call does not comply with the security policy; and
   a cryptographic module enclosing the memory and the processor.

17. The computer system of claim 16, wherein the first and second secure portions are separate and secure from each other.

18. The computer system of claim 16, wherein the application in the first secure portion is denied access to the API in the second secure portion unless the application complies with the security policy.

19. The computer system of claim 16, wherein the security policy defines symmetric key exchange algorithm.

* * * * *